United States Patent [19]

Takeuchi et al.

[11] Patent Number: 4,821,140
[45] Date of Patent: Apr. 11, 1989

[54] GAS INSULATED SWITCHGEAR DISCONNECTOR ARRANGEMENT

[75] Inventors: Hiroshi Takeuchi; Kiyokazu Torimi; Keizo Takatsuka, all of Amagasaki, Japan

[73] Assignee: Mitsubishi Denki Kabushiki Kaisha, Japan

[21] Appl. No.: 100,620

[22] Filed: Sep. 24, 1987

[30] Foreign Application Priority Data

Sep. 29, 1986 [JP] Japan ................. 61-228349

[51] Int. Cl.⁴ .................. H02B 1/20; H01H 33/12
[52] U.S. Cl. .................. 361/341; 361/335; 200/146 A; 200/148 B
[58] Field of Search ........... 361/333, 334, 335, 341, 361/342, 336, 337, 338, 339, 340, 343, 344, 345, 346, 347, 348, 349, 350; 200/144 AP, 146 A, 148 R, 148 B

[56] References Cited

U.S. PATENT DOCUMENTS

| | | | |
|---|---|---|---|
| 4,383,150 | 5/1983 | Cromer et al. | 200/144 AP |
| 4,414,451 | 11/1983 | Bleidt et al. | 200/148 H |
| 4,429,119 | 1/1984 | Pircher et al. | 200/148 R |
| 4,500,762 | 2/1985 | Yoshizumi | 200/144 AP |
| 4,523,253 | 6/1985 | Grünberg et al. | 361/335 |
| 4,638,403 | 1/1987 | Amano et al. | 361/341 |
| 4,652,708 | 3/1987 | Okuno et al. | 200/146 R |
| 4,658,329 | 4/1987 | Kamura et al. | 361/332 |
| 4,687,890 | 8/1987 | Yamamoto et al. | 200/148 B |
| 4,688,136 | 8/1987 | Yamauchi | 361/120 |

FOREIGN PATENT DOCUMENTS 61-7546 6/1986 Japan .

Primary Examiner—A. D. Pellinen
Assistant Examiner—David Osborn
Attorney, Agent, or Firm—Leydig, Voit & Mayer

[57] ABSTRACT

A gas insulated switchgear comprises main circuit disconnector units for three phases contained within a single vessel and a shunt circuit disconnector unit also contained within the vessel and provided in the vicinity of a side portion of the main circuit disconnector units. Each of the main circuit disconnector units and the shunt circuit disconnector unit comprises a stationary side electrode and a movable side electrode. Axes passing through the electrodes are arranged substantially parallel to each other. One of the movable side electrode and the stationary side electrode of the shunt circuit disconnector unit is electrically connected to one of the movable side electrode and the stationary side electrode of one of the main circuit disconnector units, whereby electrical paths can be lead out of the vessel through the shunt circuit disconnector unit.

10 Claims, 2 Drawing Sheets

GAS INSULATED SWITCHGEAR DISCONNECTOR ARRANGEMENT

BACKGROUND OF THE INVENTION

This invention relates to a gas insulated switchgear and more particularly to a gas insulated electrical power switchgear.

FIGS. 1 and 2 illustrate one example of the conventional gas insulated switchgear disclosed in Japanese Patent Abstract 86-7546.

In the figures, each of disconnector units 1 for a main circuit comprises a movable side electrode 2 and a stationary side electrode 3, and these electrodes are connected to main circuit conductors 4.

An electrical path 5 is lead from one of the electrodes 2 and 3, and a disconnector unit 6 for a shunt circuit is provided in the electrical path 5. In order to do this, a vessel 9 for the shunt circuit disconnector unit 6 is connected to an opening 8 in a vessel 7, and the electrical path 5 is taken out through this vessel 9.

The reference numerals 10 designate insulating spacers, and 11 and 12 are, respectively, movable side and stationary side electrodes of the disconnector unit 6 for the shunt circuit. It is to be noted that axes passing through the stationary side and movable side electrodes of the main circuit disconnector units 1 are arranged generally in parallel to each other.

Generally, gas insulated switchgears have a large advantage in that their components can be made compact, and they are still continuing efforts to miniaturize them.

However, the conventional shunt circuit interrupter is arranged as described above and the shunt circuit disconnector unit 6 is housed within a separate, additional vessel 9 and connected to the lead-in conductor extending from the vessel 7 containing the main circuit disconnector unit 1 in the radial direction. Therefore, the overall dimensions of the gas insulated switchgear are increased by an amount corresponding to the vessel 9 for the shunt circuit disconnector unit 6, resulting in disadvantages in installation space and costs.

SUMMARY OF THE INVENTION

Accordingly, an object of the present invention is to provide a gas insulated switchgear in which the vessel for the disconnector unit for the shunt circuit is eliminated to reduce the installation space for necessary the switchgear and costs are improved.

With the above object in view, the gas insulated switchgear of the present invention comprises disconnector units for main circuits for three phases contained within a single vessel, and disconnector units for each of the phases including a movable side electrode and a stationary side electrode, and wherein the axes passing through the electrodes are arranged in parallel to each other, the switchgear being characterized in that a disconnector unit for a shunt circuit is provided in the vicinity of the side portion of the disconnector units for the main circuits, one of the movable side electrode and the stationary side electrode of the disconnector unit for the shunt circuit being electrically connected to one of the movable side electrode and the stationary side electrode of one of the disconnector units for the three main circuits, whereby the electrical paths can be lead out through the disconnector unit for the shunt circuit.

The gas insulated switchgear of the present invention comprises a disconnector unit for a shunt circuit shunted from a main circuit, which is positioned in the vicinity of the side of the disconnector units for the main circuit and which is housed within the main circuit vessel together with the main circuit disconnector units.

Since the gas insulated switchgear of the present invention comprises a shunt circuit disconnector unit that is housed within the vessel for the main circuit and positioned side-by-side and in the vicinity of the main circuit disconnector units, the vessel for containing the shunt circuit disconnector unit therein can be eliminated.

BRIEF DESCRIPTION OF THE DRAWINGS

The present invention will become more readily apparent from the following detailed description of the preferred embodiment of the present invention taken in conjunction with the accompanying drawings, in which.

Throughout the figures, the same reference numerals designate identical or corresponding components.

DESCRIPTION OF THE PREFERRED EMBODIMENT

Figure 1:
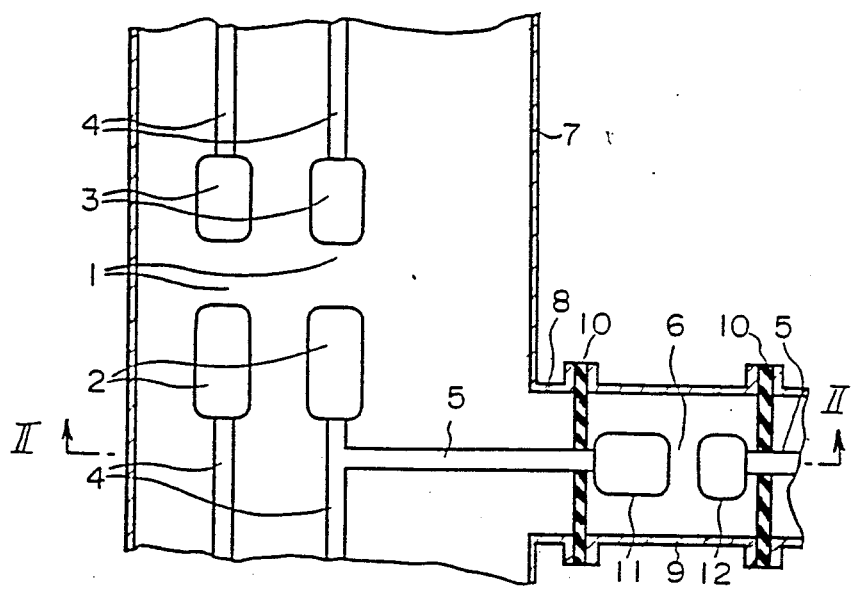
FIG. 1 is a longitudinal sectional view of a conventional gas insulated switchgear.
Figure 2:
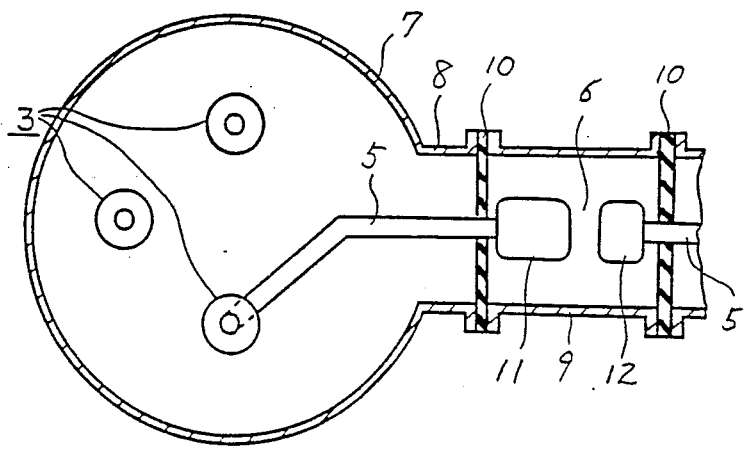
FIG. 2 is a cross sectional view taken along line II—II of FIG. 1.
Figure 3:
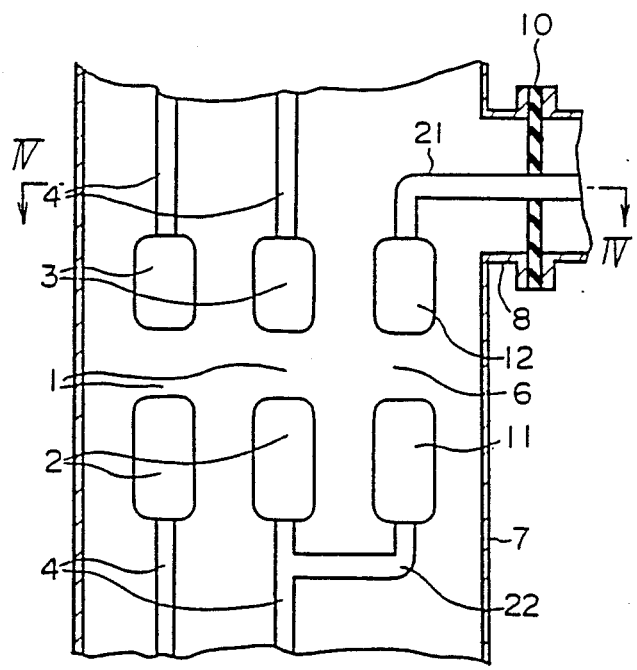
FIG. 3 is a longitudinal sectional view of one embodiment of the gas insulated switchgear of the present invention.
Figure 4:
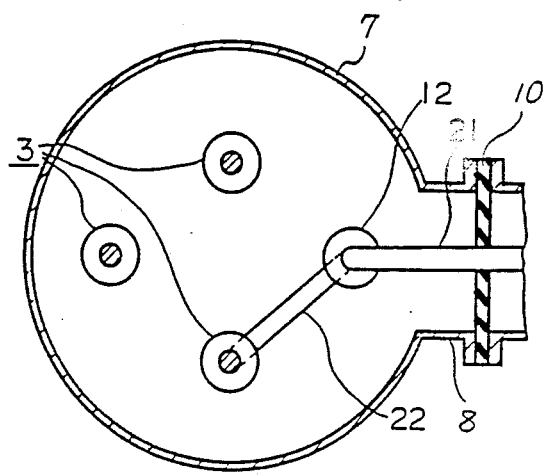
FIG. 4 is a cross sectional view taken along line IV—IV of FIG. 3.

The present invention will now be described in conjunction with FIGS. 3 and 4 showing one embodiment of the gas insulated switchgear.

In FIGS. 3 and 4, the reference numerals 1 to 4, 6 to 8 and 10 to 12 are the same or identical components shown in conjunction with the conventional switchgear.

The disconnector unit 6 for the shunt circuit is positioned substantially in a plane in which the disconnector units 1 for the main circuit are positioned and in the vicinity of the side of the disconnector units 1 and is housed within the vessel 7.

The stationary side electrode 12 of the shunt circuit disconnector unit 6 is connected to a shunt conductor 21 which extends through the opening 8 of the vessel 7 and is supported by the insulating spacer 10.

On the other hand, the movable side electrode 11 of the shunt circuit disconnector unit 6 is connected to one of the main circuit conductors 4 through a conductor 22 to shunt the conductor 4 to which the shunt conductor is connected.

While the shunt conductor 21 extends in the radial direction of the vessel 7 in the above embodiment, the shunt conductor may be arranged to extend in the axial direction of the vessel 7.

Also, while the disconnector unit 1 and 6 of the main circuit and the shunt circuit are arranged in a common plane in a diamond-shape in the above embodiment, they may be positioned at the apexes of a trapezoid or may be on different planes.

Further, the disconnector units may be replaced with interrupter units.

Furthermore, although the movable side electrode 11 of the shunt circuit disconnector unit 6 is connected to one of the main circuit conductors 4 and the stationary side electrode 12 is arranged for external connection in the above embodiment, the stationary side electrode 12 may equally be connected to the main circuit conductor 4 so that the movable side electrode 11 may be connected to the external circuit.

As has been described, according to the present invention, the disconnector unit for the shunt circuit is positioned in the vicinity of the side of the disconnector units for the main circuits, and the disconnector unit for the shunt circuit can also be housed within the vessel for the main circuit disconnector units. Therefore, a separate vessel for containing only the shunt circuit disconnector unit is not required. Thus there is provided, a gas insulated switchgear which can be installed in a reduced space and is less expensive

What is claimed is:

1. A gas insulated switchgear comprising:
   a vessel,
   main circuit disconnector units for three phases and a shunt circuit disconnector unit contained inside said vessel,
   each main circuit disconnector unit and the shunt circuit disconnector unit having a movable side electrode and a stationary side electrode,
   axes passing through said electrodes being arranged substantially parallel to each other,
   the shunt circuit disconnector unit being provided inside said vessel in the vicinity of a side portion of said main circuit disconnector units, and
   an electrical connection between one of said movable side electrodes and said stationary side electrode of the shunt circuit disconnector unit and one of said movable side electrode and said stationary side electrode of one of the main circuit disconnector units, whereby electrical paths can be lead out of the vessel through the shunt circuit disconnector unit.

2. A gas insulated switchgear as claimed in claim 1 wherein said disconnector units of the main circuit and the shunt circuit are arranged in a common plane.

3. A gas insulated switchgear as claimed in claim 1 wherein said disconnector units of the main circuit and the shunt circuit are arranged on each apex of one of a trapezoid and a diamond.

4. A gas insulated switchgear as claimed in claim 1 wherein said disconnector units of the main circuit are interrupting units.

5. A gas insulated switchgear comprising:
   a vessel;
   a plurality of main circuit disconnector units disposed inside the vessel;
   a shunt circuit disconnector unit disposed inside the vessel and connected to one of the plurality of main circuit disconnector units in parallel; and
   a plurality of circuit conductors connected to the main circuit disconnector units and the shunt circuit disconnector unit for the external connection and disposed within the vessel substantially parallel to each other.

6. A gas insulated switchgear as claimed in claim 5 wherein the plurality of main circuit disconnector units is three main circuit disconnector units.

7. A gas insulated switchgear as claimed in claim 5 wherein each of the main circuit disconnector units and the shunt circuit disconnector unit comprises a movable side electrode and a stationary side electrode.

8. A gas insulated switchgear as claimed in claim 7 wherein the main circuit disconnector units and the shunt circuit disconnector unit are disposed in a common plane.

9. A gas insulated switchgear as claimed in claim 8 wherein the main circuit disconnector units and the shunt circuit disconnector unit are disposed within the common plane in a diamond shape.

10. A gas insulated switchgear as claimed in claim 8 wherein the main circuit disconnector units and the shunt circuit disconnector unit are disposed within the common plane in the shape of a trapezoid.

* * * * *